United States Patent [19]

Sawada et al.

[11] 4,168,691
[45] Sep. 25, 1979

[54] IGNITION SYSTEM FOR INTERNAL COMBUSTION ENGINE

[75] Inventors: Daisaku Sawada; Takashi Shigematu; Yuji Takeda, all of Susono, Japan

[73] Assignee: Toyota Jidosha Kogyo Kabushiki Kaisha, Aichi, Japan

[21] Appl. No.: 715,658

[22] Filed: Aug. 19, 1976

[30] Foreign Application Priority Data

Apr. 1, 1976 [JP] Japan ................................. 51-35199

[51] Int. Cl.$^2$ ............................ F02P 5/06; F02B 5/00; F02P 5/08
[52] U.S. Cl. ............................. 123/148 E; 123/117 A; 123/119 F
[58] Field of Search ................. 123/117 A, 119, 148 E

[56] References Cited
U.S. PATENT DOCUMENTS

| | | |
|---|---|---|
| 3,717,135 | 2/1973 | Mayashi et al. ................. 123/117 A |
| 3,738,339 | 6/1973 | Huntzinger et al. ............ 123/117 A |
| 3,792,630 | 2/1974 | Hause ............................... 123/117 A |
| 3,898,894 | 8/1975 | Aono et al. ...................... 123/117 A |
| 3,918,257 | 11/1975 | Hirose et al. .................... 123/119 F |
| 4,048,966 | 9/1977 | Harada et al. ................... 123/117 A |

*Primary Examiner*—Samuel W. Engle
*Assistant Examiner*—Thomas H. Webb
*Attorney, Agent, or Firm*—Stevens, Davis, Miller & Mosher

[57] ABSTRACT

An ignition system for an internal combustion engine is described, including an ignition timing control apparatus which is useful for cleaning the exhaust gas and saving fuel, which ignition timing control apparatus is controlled by first, second and third control signals in which the first control signal represents the rotating speed of a crank shaft, the second control signal represents the value of the negative pressure in an intake manifold and the third control signal indicates that the internal combustion engine is idle.

13 Claims, 6 Drawing Figures

IGNITION SYSTEM FOR INTERNAL COMBUSTION ENGINE

The present invention relates to an ignition system for an internal combustion engine, and more particulary relates to an ignition timing control apparatus in the ignition system.

The governor type spark advance device and the vacuum type spark advance device have long been employed in ignition systems to control the spark ignition timing for firing the fuel gas in each of the cylinders. The ignition timing control apparatus, that is the governor type spark advance device and the vacuum type spark advance device, controls the ignition timing so that the engine may produce high output power. Furthermore, the ignition timing control apparatus should control the ignition timing not only for obtaining high output power of the engine but, also, for cleaning the exhaust gas of the engine and for saving fuel. The ignition timing control apparatus, especially the vacuum type spark advance device is useful for both cleaning the exhaust gas of the engine and saving fuel to some degree. The vacuum type spark advance device is comprised of an advance port which is located close to the throttle valve in the carburetor, a diaphragm which is mounted in the distributor and a pipe which applies negative pressure from the advance port to the diaphragm, where the ignition timing of the distributor is controlled by means of the diaphragm.

In recent years, it have been proposed that the ignition timing should be retarded to reduce the amount of harmful $NO_x$ and HC components in the exhaust gas. However, when the ignition timing is retarded, the engine produces irregular rotation when idling. In order to avoid this irregular rotation the supply of the air-fuel mixture to the engine can be increased while the engine is idling. However, since increasing the air-fuel mixture supply wastes fuel, this is not an economical way to solve the problem. Thus, preferably, the ignition timing should be retarded for cleaning the exhaust gas only during the time the engine is not idling. That is, the ignition timing control apparatus should not retard but advance the ignition timing selectively when the engine is idling. However, the ignition timing control apparatus of the prior art can not distinguish the state of the engine when it is idling from the state of the engine when the vehicle is decelerating. Consequently, if the prior art ignition timing control apparatus advances the ignition timing when the engine is idling it will also advance the ignition timing when the vehicle is decelerating. This is because, in each of the above two conditions, the throttle valve in the carburetor closes. It should be noted that when a vehicle is decelerating and ignition timing is advanced the amount of harmful HC components in the exhaust gas will increase and, further the engine braking capability will be reduced. Accordingly, a preferably ignition timing control apparatus should advance the ignition timing only when the engine is idling and retard the ignition timing at all other times.

Therefore, it is an object of the present invention to provide an ignition timing control apparatus which advances the ignition timing only when the engine is idling and retards the ignition timing at all other times.

The present invention will become more apparent and its construction better understood from the following detailed description with reference to the accompanying drawings, in which.

Figure 1:
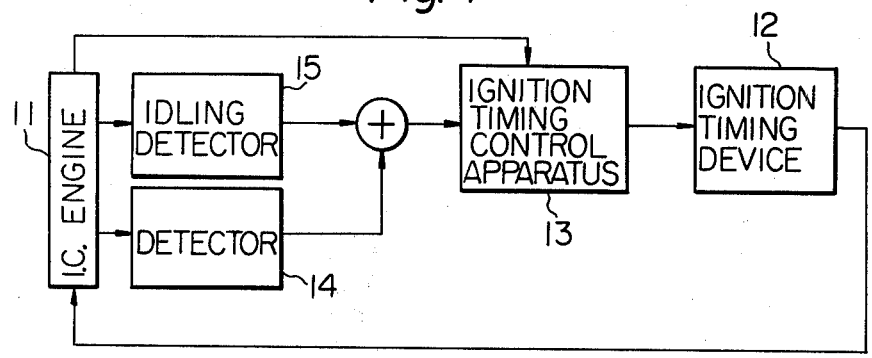
FIG. 1 is a block diagram showing an ignition timing control system in a vehicle, according to the present invention.

FIG. 1 is a block diagram showing an ignition timing control system in a vehicle, according to the present invention. In FIG. 1, reference numeral 11 indicates an internal combustion engine, and the mixture in each of the cylinders (not shown) of the engine 11 is fired by means of an ignition timing device 12. The timing of the ignition timing device 12 is controlled by an ignition timing control apparatus 13.

In the prior art, the ignition timing control apparatus (corresponding to the reference numeral 13 in FIG. 1) is comprised of a governor type spark advance device to which signals indicating the rotating speed of the engine are applied and a vacuum type spark advance device to which signals indicating the value of the negative pressure from an advance port are applied. Both the above governor type spark advance device and the vacuum type spark advance device are represented by a detector 14 in FIG. 1. The ignition timing control apparatus of the prior art (corresponding to 13) can not distinguish the state of the engine when it is idling from the state of the engine when the vehicle is decelerating. Consequently, if the ignition timing is advanced when the engine is idling for the purpose of cleaning the exhaust gas and also saving fuel, then the ignition timing is also advanced when the vehicle is decelerating. As a result of the advanced ignition timing, the amount of harmful HC components in the exhaust gas increases and the engine braking capability is reduced.

In the present invention, an idling detector 15 is added to the ignition system. The idling detector 15 detects the idling state of the engine 11 and commands the ignition timing control apparatus to advance the ignition timing. The idling detector 15 can specifically be realized by a first idling detector and/or a second idling detector, both of which detectors will be explained hereinafter.

Figure 2:
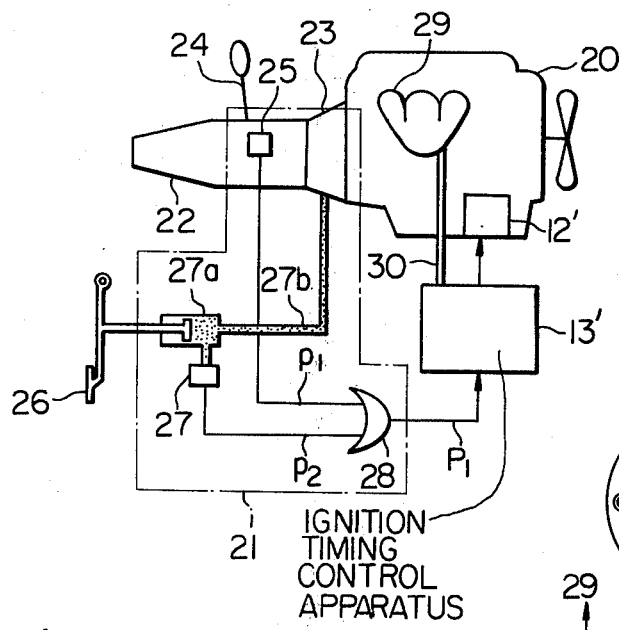
FIG. 2 is a schematic block diagram of an ignition system comprised of a first idling detector according to the present invention.

FIG. 2 is a schematic block diagram of an ignition system comprised of a first idling detector according to the present invention. In FIG. 2, the first idling detector of the present invention is enveloped by a broken line and indicated by the reference numeral 21. The reference numeral 20 indicates an engine and the engine 20 has an ignition timing device 12' thereon. The ignition timing device 12' is controlled by an ignition timing control apparatus 13', and the ignition timing control apparatus 13' is controlled by a first detecting signal $P_1$ which is provided from the output of the first idling detector 21. The first idling detector 21 detects the idling state of the engine 20 by detecting that the engine 20 is operating in a no-load condition. It should be noted that one indication that the engine 20 is operating in a no-load condition is that the transmission is in neutral, while another such indication is that the clutch is disengaged. In FIG. 2, the reference numerals 22 and 23, respectively indicate the transmission and the clutch. The state where the transmission 22 is in neutral, can be detected by a known neutral detecting switch 25 (revealed, for example, in Japanese Patent Laid Open No. 73-6732) which mechanically cooperates with a shift lever 24. The state where the clucth 23 is disengaged can be detected by detecting that a clutch pedal 26 is being pushed forward. In this regard it may be felt that whether the clutch pedal 26 is being pushed forward or not could easily be detected by using a well-known limit switch which becomes ON and OFF when the clutch pedal 26 is pushed forward and released, respectively. However, the limit switch is not practical for this use because the position at which the clutch becomes engaged and disengaged varies between vehicles and, also, with time in the same vehicle as the clutch becomes worn. Therefore, in the present invention, an oil pressure detecting switch 27 is provided for detecting engagement and disengagement of the clutch. The oil pressure detecting switch 27 becomes ON and OFF, when the oil pressure in an oil pressure piston 27a or an oil pressure pipe 27b which lead to the clutch 23, respectively, becomes high and low. The oil pressure in the piston 27a and the pipe 27b becomes high when the clutch pedal 26 is pushed forward and especially when the clutch 23 crosses into the disengaged state, while the oil pressure in the piston 27a and the pipe 27b becomes low when the clutch pedal 26 is released and especially when the clutch 23 crosses into the engaged state. Thus, a neutral detecting signal $p_1$ is obtained from the neutral detecting switch 25, and a clutch-disengagement detecting signal $p_2$ is obtained from the oil pressure detecting switch 27. When at least one of the signals $p_1$ and $p_2$ is obtained, it is detected that the engine 20 is operating in a no-load condition, that is, idling. As shown in FIG. 2, when at least one of the signals $p_1$ and $p_2$ is provided, the first idling detector 21 applies the first detecting signal $p_1$ to the ignition timing control apparatus 13' by way of an OR-circuit 28.

Figure 3:
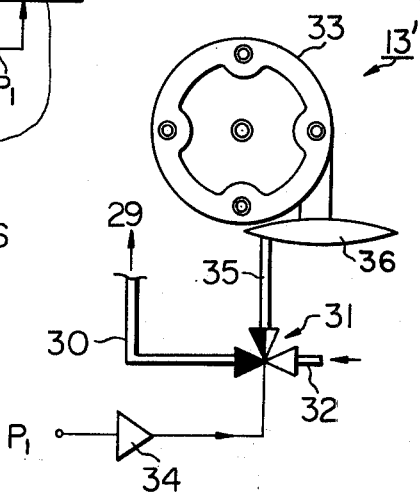
FIG. 3 is a schematic block diagram of an ignition timing control apparatus 13' shown in FIG. 2.

FIG. 3 is a schematic block diagram of the ignition timing control apparatus 13' shown in FIG. 2. In FIG. 3, the reference numeral 30 (also shown in FIG. 2) indicates a negative pressure pipe which is connected at one end to an intake manifold 29 (also shown in FIG. 2). The other end of the pipe 30 is connected to an electromagnetic valve 31. The electromagnetic valve 31 applies negative pressure in the pipe 30 and atmospheric pressure in a pipe 32 selectively through a pipe 35. When the first detecting signal $p_1$ is provided from the first idling detector 21 (shown in FIG. 2) and then is applied to a power-amplifier 34, the power-amplifier 34 drives the electromagnetic valve 31 to apply negative pressure to a diaphragm 36, that is the ignition timing device. The diaphragm 36 then causes a distributor 33 to advance the ignition timing.

Figure 4:
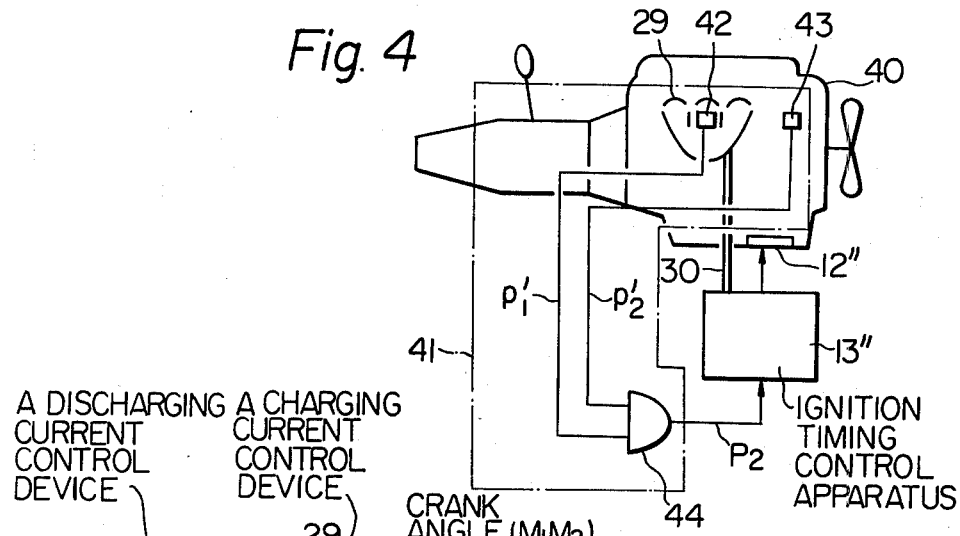
FIG. 4 is a schematic block diagram of an ignition system comprised of a second idling detector according to the present invention.

FIG. 4 is a schematic block diagram of an ignition system comprised of a second idling detector according to the present invention. The second idling detector of the present invention is enveloped by a broken line and is indicated by the reference numeral 41. The reference numeral 40 indicates an engine and the engine 40 has an ignition timing device 12" thereon. The ignition timing device 12" is controlled by an ignition timing control apparatus 13", and the ignition timing control 13" is controlled by a second detecting signal $P_2$ which is provided from the output of the second idling detector 41. The second idling detector 41 detects the idling state of the engine 40 by detecting the following two conditions. The first condition is that the throttle valve (not shown) in the carburetor (not shown) is closed. When the first condition is detected, it means that the engine 40 is idling or the vehicle is decelerating. Whether the throttle valve is closed not is detected by a known throttle-valve-close detecting switch 42 which cooperates with the throttle valve and provides a signal $p_1'$ when the throttle valve is closed. The second condition is that the rotating speed of the crank shaft (not shown) in the engine 40 is lower than a predetermined rotating speed. The rotating speed of the crank shaft is detected by a known speed detector 43 which provides a signal $P_2'$ when the rotating speed is lower than the predetermined speed. Although the throttle valve is closed, if the rotating speed of the crank shaft is higher than the predetermined rotating speed, the state of the engine 40 is not that of idling but that of being under the influence of vehicle deceleration. Thus, when the engine is idling, both a throttle-valve-close detecting signal $P_1'$ is obtained from the throttle-valve-close detecting switch 42 and a rotating speed detecting signal $P_2'$ is obtained from the speed detector 43. As shown in FIG. 4, when both of the signals $P_2'$ and $P_2'$ are provided at the same time, the second idling detector 41 applies the second detecting signal $P_2$ to the ignition timing control apparatus 13" by way of an AND-circuit 44.

Figure 5:
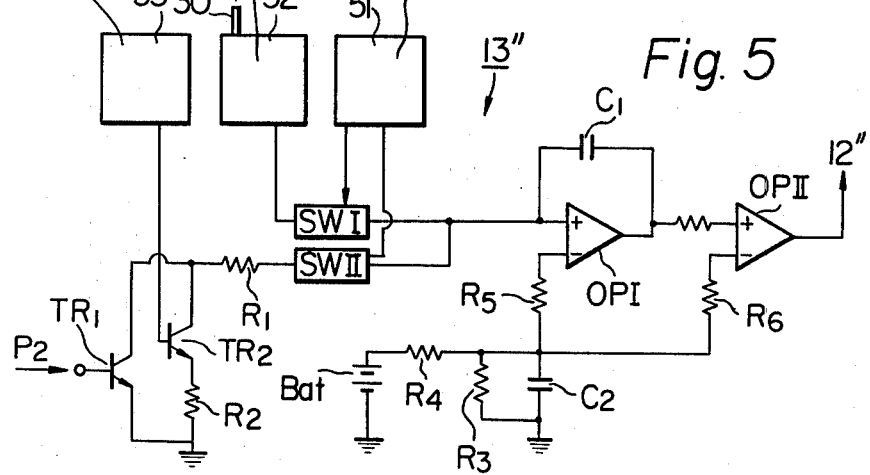
FIG. 5 is a circuit diagram of an ignition timing control apparatus 13" shown in FIG. 4.

FIG. 5 is a circuit diagram of the ignition timing control apparatus 13" shown in FIG. 4. In FIG. 5, the reference numeral 30 (also shown in FIG. 4) indicates the negative pressure pipe which is connected to the intake manifold 29 (also shown in FIG. 4). The reference numeral 12" (also shown in FIG. 4) indicates the ignition timing device which is comprised of a transistor switching circuit. The transistor switching circuit causes a current flow or no current flow in the primary winding of the ignition coil (not shown). When the current flow in the primary winding is stopped, a high voltage pulse is induced in the secondary winding of the ignition coil, and the high voltage pulse is supplied to the distributor rotor (not shown).

Figure 6:
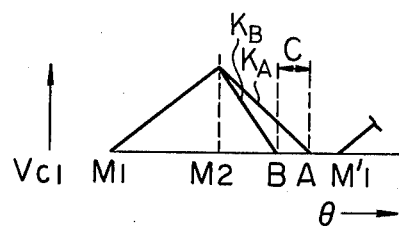
FIG. 6 is a graph utilized for explaining the operation of the ignition timing control apparatus shown in FIG. 5.

The operation of the ignition timing control apparatus 13" will now be explained with reference to FIG. 6. In FIG. 6, the abscissa indicates the rotating angle $\theta$ of the crank shaft and the ordinate indicates the charging voltage $V_{C1}$ of a capacitor $C_1$ shown in FIG. 5. The symbols A and B are so-called BTDC (Before Top Dead Center) angles, and the advance angle B is more advanced than the advance angle A by the angle C. A predetermined rotating angle $M_2$ is more advanced than the advance angle B, and a predetermined rotating angle $M_1$ is more advanced than the predetermined rotating angle $M_2$. When the rotating angle of the crank shaft passes through the predetermined rotating angle $M_1$, the capacitor $C_1$ in FIG. 5 starts being charged. When rotating angle of the crank shaft passes through the predetermined rotating angle $M_2$, the capacitor $C_1$ stops being charged and, then, starts being discharged along the line $K_A$ or $K_B$ shown in FIG. 6. When the charging voltage $V_{C1}$ of the capacitor $C_1$ reaches zero voltage the above-mentioned advance angle A or B is obtained. The time between the predetermined rotating angles $M_1$ and $M_2$, that is the time during which the capacitor $C_1$ is charged, is provided so that a suitable advance angle (BTDC) may be obtained for each of the corresponding rotating speeds of the crank shaft. The predetermined rotating angle $M_1$ is detected by a rotating angle detector 51 (FIG. 5) which detects the rotating angle of the crank shaft. When the predetermined rotating angle $M_1$ is detected by the detector 51, the detector 51 closes an analoque switch SWI and, at the same time, opens an analoque switch SWII. Then, the capacitor $C_1$ starts being charged. The capacitor $C_1$ is connected in series with a feed back loop of one of the operational amplifiers OPI and OPII both of which form a differential amplifier. The current for charging the capacitor $C_1$ is supplied from a charging current control device 52. The charging current control device 52 provides a charging current of a value proportional to the value of the negative pressure in the intake manifold 29, which negative pressure is applied to the charging current control device 52 by way of the negative pressure pipe 30. Next, when the predetermined rotating angle $M_2$ is detected by the detector 51 the detector 51 opens the analoque switch SWI and, at the same time, closes the analogue switch SWII. Then, the capacitor $C_1$ starts being discharged. The discharging current from the capacitor $C_1$ flows through a resistor $R_1$ and a transistor $TR_1$, or through the resistor $R_1$, a transistor $TR_2$ and a resistor $R_2$. A discharging current control device 53 provides an output voltage with a magnitude which gradually increases in proportion to the change of the rotating speed of the engine 40 when the rotating speed gradually changes from low speed to high speed. Thereby, a suitable advance angle for each of the corresponding rotating speeds is obtained. When a vehicle engine is not idling and the vehicle is running normally, the level of the second detecting signal $P_2$ is "L," which represents that the engine 40 is not idling. As the second detecting signal $P_2$ which is now "L" is applied to the base of the transistor $TR_1$, the transistor $TR_1$ becomes non-conductive. Since the transistor $TR_1$ is non-conductive, the discharging current from the capacitor $C_1$ flows through the resistor $R_1$, the transistor $TR_2$ and the resistor $R_2$. Accordingly, it takes a relatively long time for the capacitor $C_1$ to discharge and, thus, each of the advance angles is retarded. As a result, in FIG. 6, each of the ignition timings, that is BTDC may be set close to the advance angle A or at the advance angle A. When the level of the second detecting signal $P_2$ is "H," which represents that the engine 40 is idling, the transistor $TR_1$ is made conductive. Then, the capacitor $C_1$ is quickly discharged through the resistor $R_1$ and the transistor $TR_1$ which now has no resistance. Accordingly, each of the advance angles is advanced. As a result, the ignition timing is advanced when the engine 40 is idling. In this case, the device 53, the transistor $TR_2$ and the resistor $R_2$ are not active with respect to the control of the ignition timing. In FIG. 5, the symbol Bat represents a battery, the symbols $R_3$ and $C_2$ respectively represent a resistor and capacitor, and both the resistor $R_3$ and the capacitor $C_2$ form a time-constant circuit for stabilizing the variation of the output voltage of the battery Bat. The symbol $R_4$ represents a protective resistor, and the symbols $R_5$ and $R_6$ are resistors. The resistors $R_5$ and $R_6$ are provided for supplying reference voltages to the operational amplifiers OPI and OPII, respectively.

As explained above, the ignition system for an internal combustion engine according to the present invention is useful for cleaning exhaust gas and also saving fuel. It will easily be recognized that the above detecting signal ($P_1$ or $P_2$) may also be applied for controlling an air conditioner in the vehicle. An air conditioner requires a great amount of power and, therefore, the power generated by the engine is usually insufficient when the engine is idling. Consequently, the power generated by engine has to be increased when it is idling. The above detecting signal ($P_1$ or $P_2$) may preferably be utilized for a signal which commands an increase in engine speed so as to increase the power generated by the engine when it is idling.

What is claimed is:

1. In an ignition system for an internal combustion engine including an intake manifold and an ignition timing control apparatus which controls the advance angle of a distributor in each rotation of a crank shaft of the internal combustion engine, said ignition timing control apparatus being controlled by a first engine-idling indicating electrical control signal which represents the rotating speed of the crank shaft and a second engine-idling indicating electrical control signal which represents the magnitdue of negative pressure in the intake manifold, the improvement that comprises an engine idling detector for producing a third engine-idling indicating electrical control signal only whenever the engine is idling for controlling said ignition timing control apparatus, said third signal indicating that the internal combustion engine is idling.

2. An ignition system for an internal combustion engine as set forth in claim 1, wherein said idling detector comprises an OR circuit which receives a fourth input signal which indicates that a transmission of the internal combustion engine is in neutral condition and a fifth input signal which indicates that a clutch of the internal combustion engine is disengaged.

3. An ignition system for an internal combustion engine as set forth in claim 1, wherein said idling detector comprises an AND circuit which receives a fourth input signal which indicates that a throttle valve in a carburetor of the internal combustion engine is deactivated and a fifth input signal which indicates that the rotating speed of the crank shaft is lower than a predetermined low rotating speed.

4. An ignition system for an internal combustion engine as set forth in claim 2, further comprising an oil pressure detecting switch for producing the fifth signal when the level of an oil pressure is detected to be higher than a predetermined level, and said oil pressure detecting switch detects the level of the oil pressure which is applied to a device which causes the clutch to engage or disengage.

5. An ignition system for an internal combustion engine including an intake manifold, a negative pressure line connected at one end to said intake manifold, and an ignition timing control apparatus which controls the advance angle of a distributor during rotation of a crank shaft of the internal combustion engine, said ignition timing control apparatus being operable to control negative pressure from the intake manifold to be applied to a diaphragm cooperating with a distributor, said ignition timing control apparatus further comprising:
(a) an engine idling detector which detects an idling condition of the internal combustion engine and produces an output signal indicative thereof for advancing the ignition timing during engine idling; and
(b) an electromagnetic valve in said negative pressure line so as to close or open the negative pressure line alternately, said electromagnetic valve being driven to open the negative pressure line by the output signal from said idling detector when the internal combustion engine is in an idling condition.

6. An ignition system as set forth in claim 5, wherein said idling detector comprises:
    (a) a throttle-valve-close detecting means which cooperates with a throttle valve and produces a first detecting signal when the throttle valve is inactivated;
    (b) a speed detector which is responsive to the speed of crank shaft rotation and produces a second detecting signal when the rotating speed of the crank shaft is lower than a predetermined rotating speed; and
    (c) an AND circuit which produces said output signal for indicating that the internal combustion engine is in an idling condition when both said first and second detecting signals are applied simultaneously to the AND circuit.

7. An ignition system as set forth in claim 5, wherein said idling detector comprises a neutral detecting switch which produces an output signal when a transmission is in a neutral condition.

8. An ignition system for an internal combustion engine including an ignition timing control apparatus which controls the advance angle of a distributor during rotation of a crank shaft of the engine, said ignition timing control apparatus cooperating with a capacitor and being operated in such manner that, first, a current for charging the capacitor is supplied in proportion to the value of the negative pressure in an intake manifold after the crank shaft passes through a predetermined first rotating angle, second, a current for discharging the capacitor starts flowing in proportion to the rotating speed of the crank shaft after the crank shaft passes through a predetermined second rotating angle and, third, the ignition timing is determined when the value of the current for discharging the capacitor becomes equal to or lower than a predetermined value of the current, said ignition timing control apparatus further comprising:
    (a) an engine idling detector which detects when the internal combustion engine is in an idling condition;
    (b) a bypass connected in parallel with a path through which said current for discharging the capacitor passes; and
    (c) a switching device connected in series with said bypass so as to render the bypass conductive or non-conductive alternately, said switching device being controlled to make the bypass conductive when the internal combustion engine is in an idling condition.

9. An ignition system as set forth in claim 8, wherein said idling detector comprises:
    (a) a throttle-valve-close detecting means which cooperates with a throttle valve and produces a first detecting signal when the throttle valve is deactivated;
    (b) a speed detector which cooperates with a crank shaft and produces a second detecting signal when the rotating speed of the crank shaft is lower than a predetermined rotating speed; and
    (c) an AND circuit which produces an output signal for indicating when the internal combustion engine is in an idling condition when both said first and second detecting signals are applied simultaneously to the AND circuit.

10. An ignition system as set forth in claim 8, wherein said idling detector comprises a neutral detecting switch which provides an output signal when a transmission is in a neutral condition.

11. In an ignition system for an internal combustion engine including an intake manifold and an ignition timing control apparatus which controls the advance angle of a distributor during rotation of a crank shaft of the engine, said ignition timing control apparatus being controlled by a first engine-idling condition indicating electrical control signal which is indicative of the rotational speed of the crank shaft and a second engine-idling condition indicating electrical control signal which represents the magnitude of negative pressure in the intake manifold of the engine, the improvement comprising:
    means for advancing the ignition timing in response to said signals when the engine is in an idling condition and for retarding the ignition timing during all other operating conditions of the engine.

12. An ignition system as claimed in claim 11, wherein:
    said means comprises an engine idling detector for producing a third control signal for said ignition timing control apparatus only when the engine is in an idling condition.

13. In an ignition system for an internal combustion engine including an intake manifold and an ignition timing control apparatus which controls the advance angle of a distributor during rotation of a crank shaft of the engine, said ignition timing control apparatus being controlled by a first engine-idling condition indicating electrical input signal which is indicative of the rotational speed of the crank shaft and a second engine-idling condition indicating electrical input control signal which represents the magnitude of negative pressure in the intake manifold of the engine, the improvement comprising:
    means for advancing the ignition timing in response to said signals when the engine is in an idling condition and for retarding the ignition timing during all other operating conditions of the engine, said means comprising an engine idling detector for producing a third engine-idling indicating electrical control signal for said ignition timing control apparatus only when the engine is in an idling condition, said engine idling detector comprising an AND circuit which receives said second input signal which indicates that a throttle valve in a carburetor of the engine is deactivated and said first input signal which indicates the crank shaft is rotating at a speed lower than a predetermined rotating speed.

* * * * *